Feb. 5, 1957     W. E. FINNEY ET AL     2,780,005
GAUGE FOR ROTOR THREAD PROFILE
Filed Feb. 23, 1955     2 Sheets-Sheet 1
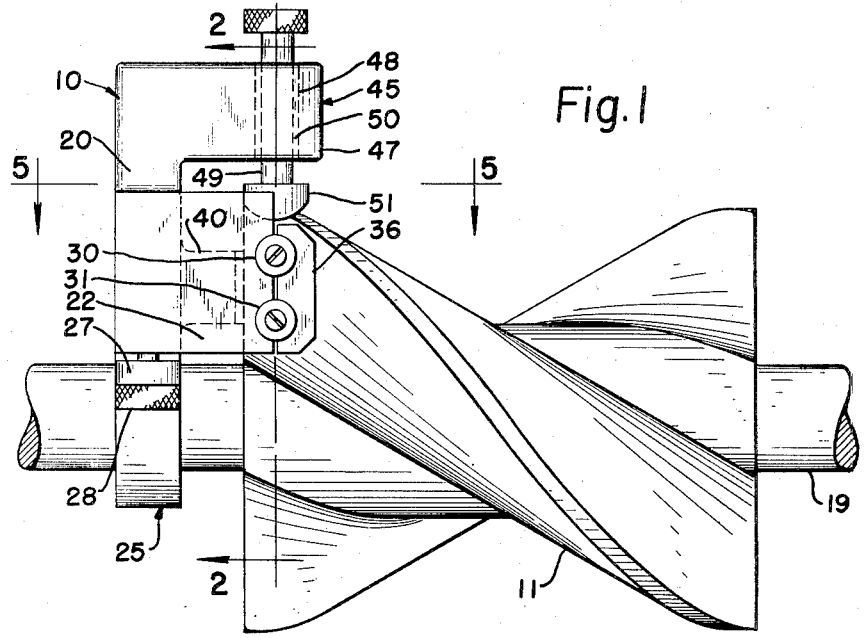
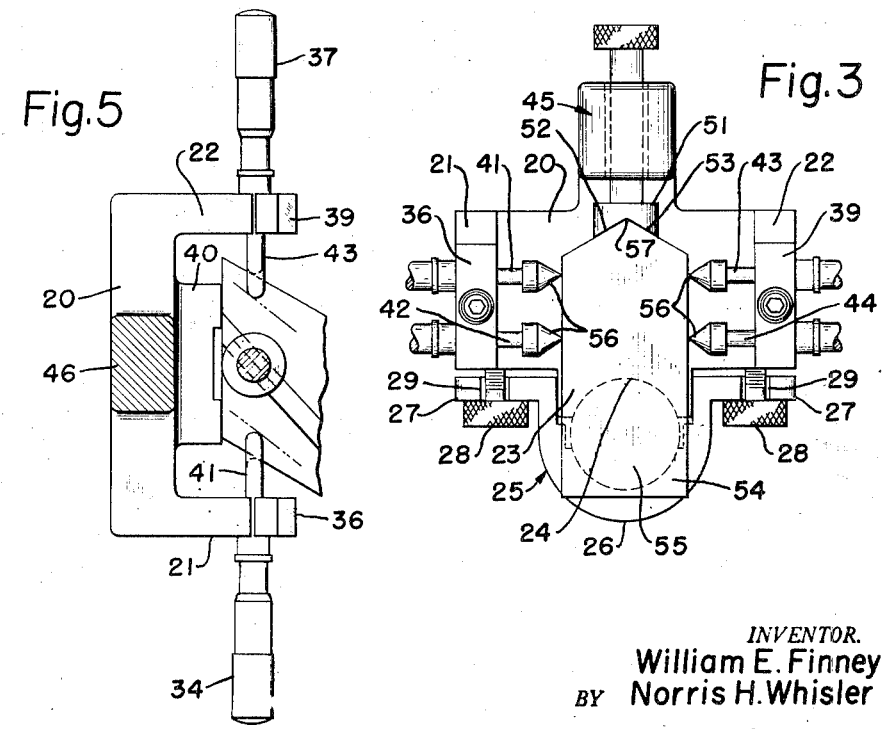
INVENTOR.
William E. Finney
BY Norris H. Whisler
Otto Mueller
Attorney Feb. 5, 1957 W. E. FINNEY ET AL 2,780,005
GAUGE FOR ROTOR THREAD PROFILE
Filed Feb. 23, 1955 2 Sheets-Sheet 2
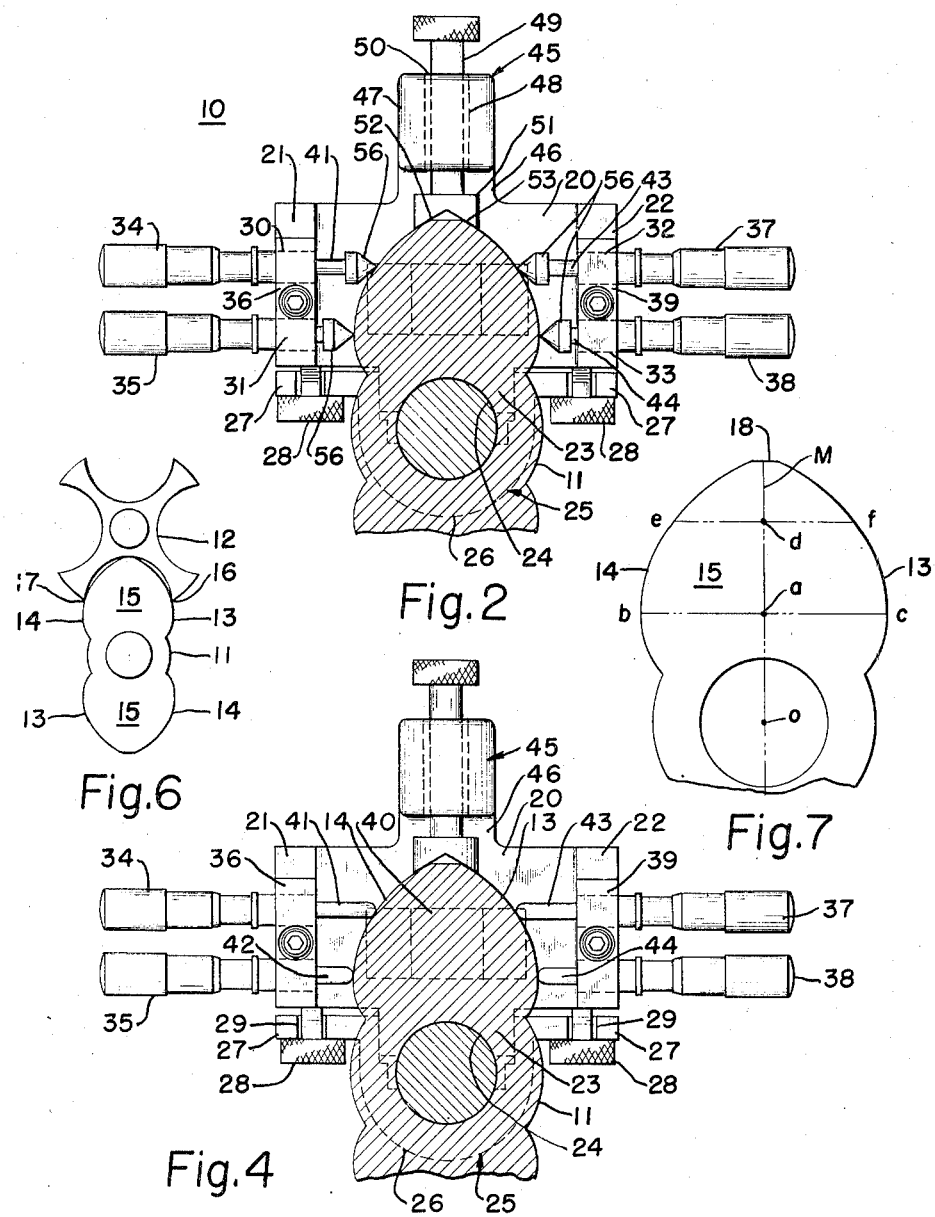
*INVENTOR.*
William E. Finney
BY Norris H. Whisler
Otto Moeller
Attorney

United States Patent Office 2,780,005
Patented Feb. 5, 1957

2,780,005

GAUGE FOR ROTOR THREAD PROFILE

William E. Finney and Norris H. Whisler, York, Pa., assignors, by mesne assignments, to Capitol Products Corporation, Mechanicsburg, Pa., a corporation of Pennsylvania Application February 23, 1955, Serial No. 489,869

6 Claims. (Cl. 33—174)

This invention relates to gauges and particularly to a gauge for checking the accuracy of the male rotor of an axial flow fluid device of the type provided with a pair of rotatably mounted rotors provided with complementary intermeshing helical threads preferably of such configuration to provide a continuous seal line therebetween and which cooperate with the walls of the chambers in which they rotate to form fluid pockets that advance from one end of the chambers to the other.

In devices of the type described, the smallest practical clearance is provided between the intermeshing rotors and between them and the casing, so as to reduce to a minimum the leakage of fluid from the fluid pockets. In order to provide such a minimum practical clearance, the flanks of the rotors must be machined with utmost precision and it is an object of this invention to provide a gauge for readily determining the accuracy of the flanks of the male rotor.

Another object is to provide a gauge which is easy to operate and which will give a direct reading of the deviation of the flank of the rotor from its theoretically correct contour.

A further object is to provide a gauge that is readily applied to the rotor while the latter is disposed on the work arbor of the cutting machine and will give an accurate measure for setting or resetting the cutting tools for accurately cutting the rotor flanks.

A still further object is to provide a gauge which when applied to the rotor thread is adapted to effect self centering of the rotor thread between the sensing terminals of the gauge whereby the contour of the opposite flanks of the rotor thread with respect to the median line bisecting the crest of the thread and extending through the axis of the rotor, are directly measured, whereby the deviation of the opposite flanks from the theoretically correct value is readily ascertainable and provides a measure for setting or resetting the cutting tools for cutting the respective flanks of the rotor thread.

Other objects and advantages reside in the construction of parts, the combination thereof and the mode of operation, as will become more apparent from the following description when taken in conjunction with the accompanying drawings.

In the drawings:

Figure 1 is a side elevation of a gauge embodying my invention showing the gauge mounted on the work arbor of the cutting machine and applied to the rotor being cut;

Figure 2 is a sectional view taken on the line 2—2 of Figure 1;

Figure 3 is a front elevational view of the gauge showing a gauge block applied thereto for presetting the micrometers of the gauge;

Figure 4 is a view similar to the view shown in Figure 2, but with the sharp sensing thimbles of the micrometers removed;

Figure 5 is a sectional view taken on the line 5—5 of Figure 1, showing the rounded sensing terminals of the micrometers in engagement with the rotor thread flanks;

Figure 6 is an end view of a rootr of the type to which the gauge is applicable, the rotor being shown in mesh with its complementary rotor; and Figure 7 is an enlarged end view of the thread of a rotor to which the gauge is applicable.

In the drawings the gauge 10 is depicted for purpose of illustration as applied to the main or male rotor 11 of an axial flow positive displacement blower. A blower having incorporated therein a rotor such as rotor 11 is disclosed and described in J. E. Whitfield Patent No. 2,287,716, granted June 23, 1942, and since the blower does not constitute any part of the present invention, it is not shown.

Such axial flow positive displacement blower is provided with complementary intermeshing rotary screw members commonly referred to as the main or male rotor, such as the rotor 11, and the gate or female rotor, such as the rotor 12 shown in Fig. 6, the former generally having fully addendum threads, the flanks of which have profiles of convex curvature and the latter fully dedendum threads, the flanks of which have profiles of concave curvature.

The thread form of the rotor 11, to which the gauge 10 is shown applied in the drawings, is of the fully generated symmetrical type. In other words, the flanks 13 and 14 of rotor thread 15 are generated respectively by the intersections of the flanks of the thread of the gate rotor 12 with the periphery or pitch circle thereof, thus referring to Fig. 6, the flank 13 of rotor thread 15 is described by the crest edge 16 of the gate rotor 12 and the flank 14 is described by the crest edge 17. The flanks 13 and 14 of rotor thread 15 in any cross section through the rotor 11 perpendicular to the axis thereof, are equidistant from a median line M bisecting the crest 18 of the rotor thread 15 and extending through the axis of the rotor 11, as shown in Figure 7.

With the following information: pitch diameter—gate rotor 12; outside diameter—gate rotor 12; pitch diameter—main rotor 11; outside diameter—main rotor 11; intermeshing clearance between rotors 11 and 12; crest dimension—crest 18 of main rotor 11; center distance—between rotors 11 and 12; the formula of the flank curvature can be mathematically derived, by means of which the theoretical perpendicular distance from any point on the curves of the main rotor flanks to the median line M measured in a plane normal to the axis of rotation of the rotor can be determined.

Referring particularly to Fig. 7, taking an arbitrary distance oa from the axis of the rotor along the median line M, the dimensions ab and ac for a theoretically perfect rotor can be mathematically determined, and similarly taking an arbitrary distance od, the dimensions de and df for a theoretically perfect rotor can be mathematically determined.

The gauge, hereinafter described, is applied to a machined rotor, also as hereinafter described, to determine if the machined rotor is true within the permitted tolerances. The gauge registers a direct reading of the dimensions ab and ac, and the dimensions de and df of the opposite flanks of the machined rotor which, upon comparison with the theoretically correct value of these dimensions, will determine if the rotor has been accurately machined. If the readings reveal that insufficient stock has been removed, they provide a measure for proper setting of the cutting tools for removing such excess stock. The blanks for such rotors are cast oversize to the approximate shape of the rotor and it is customary to first take a rough cut followed by a finishing cut. After the rough cut has been taken, the gauge may be applied to the rotor and from the readings the proper setting of the tools may be determined for accurate cutting of the rotor by the finish cut.

It is to be noted that in the case of the rotor above described two reference points are employed on each flank of the rotor. Since the flanks are simple generated curves, if the readings taken at these two points on each flank are theoretically correct within the permitted tolerances, then all other points on the rotor flanks should be correct. It is apparent, however, that any number of reference points may be employed.

In Figure 1, the rotor 11, which has been machined or partly machined, is shown on the work arbor 19 of a suitable machine for cutting the rotor 11, and since the particular machine employed for cutting the rotor forms no part of the present invention, only the work arbor 19 is shown. The gauge 10, which as shown in Figure 1 is mounted on the arbor 19 in position for gauging the rotor 11, will now be described in detail.

The gauge 10 includes a preferably rectangular wall 20 having substantial thickness to provide rigidity. Micrometer supporting wing members 21, 22, perpendicular to the plane of the wall 20, extend from the respective marginal side edges of the wall 20 and are preferably formed integral therewith. A square shouldered lug 23, also preferably formed integral with the wall 20, depends from the base of the wall 20 centrally between the sides thereof. The lower or free edge of the lug 23 is provided with a circular recess 24 adapted to closely fit the arbor 19 when the gauge 10 is mounted on the arbor 19. The gauge 10 is secured on the arbor 19 by a clamp 25 having a generally U-shaped frame 26 with integrally formed outwardly extending flanges 27 at the upper ends of the U. The upper inner wall portions of the U-shaped frame 26 are straight to receive and closely fit the square shouldered lug 23, while the lower inner wall portion is arcuately formed to closely fit the arbor 19. By means of thumb screws 28 extending through openings 29 in the flanges 27 and threaded into the base of the wall 20, the gauge 10 can be secured on the arbor 19 in any one of a number of positions axially therealong and radially thereabout.

The end faces of the wings 21 and 22 are each provided with an upper and lower groove so disposed that when the gauge is properly positioned with respect to the rotor 11, as will be hereinafter explained, the projected axes of upper groove 30 and lower groove 31 of wing 21 will extend through points $e$ and $b$, respectively, and the projected axes of upper groove 32 and lower groove 33 of wing 22 will extend through points $f$ and $c$. Micrometers 34 and 35 are mounted in respective grooves 30 and 31, and are releasably secured therein by means of clamp 36 bolted to the grooved end face of wing 21. Similarly, micrometers 37 and 38 are mounted in respective grooves 32 and 33, and are releasably secured therein by means of clamp 39 bolted to the grooved end face of wing 22.

A preferably integrally formed boss 40 extends outwardly from the plane of the wall 20 centrally between the wings 21 and 22 but is of less extent than the wings 21 and 22. The boss 40 is arranged to abut the end face of the rotor 11 to properly orient the gauge 10 axially with respect to the rotor 11, so that the work sensing terminals of the micrometers will engage the flanks 13 and 14 of rotor thread 15 a predetermined distance inward from the end face of the rotor 11, as best shown in Figure 5.

As previously stated, the gauge 10 measures the distances from selected points $a$ and $d$ on the median line M of the rotor thread to the points $b$, $c$ and $e$, $f$, respectively on the flanks of the rotors. Since the micrometers 34, 35, 37 and 38, on which these distances are read, are carried by the gauge 10, it is apparent that the rotor thread being measured must be accurately located or centered with respect to the gauge so that the extended axes of the micrometer spindles 41, 42, 43 and 44 will intersect the theoretically correct points $e$, $b$, $f$ and $c$, respectively, of a perfect rotor thread, which points as previously stated, are known calculated distances from the points $d$ and $e$ on the median line M of the rotor thread.

In order to so properly position the gauge with respect to the rotor thread, the gauge is provided with centering means 45 which includes a lug 46 projecting from the top of the wall 20 midway between the sides thereof. The lug 46 has formed therewith an overhanging block 47 projecting from the upper portion thereof in the same direction with respect to the plane of the wall 20 as the wing members 21, 22. The overhanging block 47 is provided with a bore 48, the extended axis of which will intersect the axis of the arbor 19 when the gauge is mounted on the arbor 19, and which extended axis will also lie in a common plane with the axes of the spindles 41, 42, 43, 44 of the micrometers 34, 35, 37, 38. A stem 49 has a sliding fit in a bushing 50 in bore 48, it being understood that the axis of stem 49 coincides with the axis of the bore 48. On the lower end of stem 49 is a preferably integrally formed centering block 51 provided with a pair of intersecting plane surfaces 52 and 53 disposed at an obtuse angle with respect to one another, and forming a shallow dihedral, the apex of which intersects the axis of stem 49. The plane surfaces 52 and 53 are adapted preferably to tangentially contact the respective flanks of rotor thread 15 closely adjacent the crest of the rotor thread, though if desired they may contact the crest edges of the rotor thread.

The centering means 45, as described above, thus provides means for accurately positioning the gauge 10 with respect to the rotor thread 15. As previously explained, the gauge 10 is secured on the arbor 19 by means of the clamp 25. Now by loosening the thumb screws 28, the gauge 10 can be rotatably adjusted about the axis of arbor 19 to a position in which the surfaces 52 and 53 of centering block 51 tangentially contact the respective flanks of the rotor thread 15 closely adjacent the crest thereof, after which the gauge can be secured in position by tightening the thumb screws 28. The stem 49 of centering means 45 having a slidable fit in the bushing 50, is also adapted to turn therein about its axis so that the centering block 51 will turn to accommodate itself to the helix angle of the rotor thread.

As previously brought out, the relative axial disposition of the gauge 10 with respect to the rotor 11 is fixed by abutment of the boss 40 of gauge 10 against the end face of the rotor. Preferably the relative extent of the boss 40, the micrometer supporting wing members 21, 22, and the centering means 45, from the wall 20 of the gauge, is such that the sensing terminals of the micrometers engage the rotor thread about one-half inch inwardly from the end face of the rotor; however if desired the extent of these elements can be such that the sensing terminals of the micrometers may engage the rotor thread at any desired distance from the end face of the rotor.

Where, as generally is the case, the distances $de$, $df$, $ab$, and $ac$, from the median line M to the flanks of the rotor thread are greater than the micrometer scales, the micrometers 34, 35, 37 and 38 are set to zero reading against a symmetrical gauge block 54, as shown in Fig. 3. The block 54 has a cylindrical lug 55 projecting outwardly from the lower portion thereof simulating the arbor 19 and arranged to be clamped in the circular recess 24 of the gauge 10. The upper end of the gauge block 54 is inverted V-shaped, the apex 57 being arranged to be received in the centering block 51 of the centering means 45. As previously stated, gauge block 54 is symmetrical, that is, it is symmetrical with respect to a plane extending through the axis of the gauge block lug 55 and the apex 57 of the gauge block, with the sides of the gauge block being equidistant from this plane.

With the gauge block 54 centered in the gauge 10, the micrometers are adjusted to zero reading with their sensing terminals engaging the sides of the gauge block, and are clamped in position by means of clamps 36 and 39. After now removing the gauge block 54, the gauge may be applied to the arbor 19 and rotor 11 as previously described. The micrometer readings are now taken with the sensing terminals contacting the flanks of the rotor thread. These readings plus one half the known width of the gauge block 54 give a direct value of the dimensions of the rotor flank measured from the median line M. By comparing these values with the theoretical values *de, df, ab* and *ac* of a perfect rotor thread, the deviation of the flanks of the rotor thread being measured from the mathematically calculated value is readily determined.

If the rotor threads are cut by a turning operation with the feed axially of the rotor, the gauge may be applied to the rotor after the cutting operation has proceeded about a half inch axially of the rotor. Should the gauge reveal that one or both flanks are still oversize, the micrometer readings provide a measure for resetting the cutting tools to accurately cut the rotors. Of course, where the rotors are cut by a planing operation, as disclosed in J. E. Whitfield Patent No. 2,473,233, granted June 14, 1949, the gauge may be used in checking a completed rotor.

While the gauge has been described above as applied to a rotor, wherein the formula of the flank curvature can be mathematically derived, it can also be applied to rotors wherein the formula of the flank curvature cannot be practically derived mathematically. In such cases a perfect rotor may be fashioned by trial and error and when obtained certain reference points on the flanks may be determined by actual measurement and used in designing the gauge with reference to those points.

In Figure 2 the sensing terminals of the micrometers are shown as removable conical thimbles 56 having sharp sensing points disposed on the axes of the micrometer spindles. Because of wearing of these sensing points it is not practicable to use them when gauging rotors on a production basis. For day after day gauging of rotors these thimbles 56 are removed and the measurements are taken with the rounded sensing terminals of the micrometer spindles. The rounded sensing terminals obviously will not contact the rotor flanks at exactly the points *b, c, e* and *f* as will the sharp sensing points of the thimbles 56. This is due to the helix of the rotor thread and the curve of the rotor thread flank.

In actual practice, therefore, the thimbles 56 are used in obtaining measurements of a perfect rotor thread, and when obtained, the micrometer readings for such perfect rotor thread are taken. The same rotor is then measured with the thimbles 56 removed, and the new readings are then used as reference figures for gauging all subsequent rotors as shown in Figures 4 and 5.

While a preferred embodiment of the invention has been described, it will be understood that various changes may be made in the form, details, proportion and arrangement of parts, the combination thereof and mode of operation, without departing from the scope of the invention.

We claim:

1. Means for measuring the deviation of the flank profiles of the thread of a helical rotor from a known desired profile, a shaft on which the rotor is adapted to be mounted, a gauge having a body, the base of said body having means for mounting said gauge on said shaft in axially spaced relation with respect to said rotor for rotary movement about the axis of said shaft, spaced wings extending from the respective sides of said body straddling the flanks of a rotor thread, micrometers supported by said wings and extending toward each other to engage the respective flanks of said rotor thread, a support member carried by the top of said gauge body overhanging the end of said rotor thread, a stem slidably and rotatably mounted in a bore in said support member, and an inverted V-block carried by the lower end of said stem for engagement with said rotor thread at its crest for rotatively positioning the gauge in predetermined relation with respect to said rotor thread.

2. A construction as defined in claim 1 in which the micrometers are so disposed in said supporting wings that the extended axes thereof intersect the flanks of a rotor thread of known desired profile at points lying in a common plane normal to the axis of the rotor.

3. A construction as defined in claim 2 in which the axis of the V-block supporting stem lies in said common plane.

4. A construction as defined in claim 1 in which the extended axis of the V-block stem intersects the extended axis of rotation of said gauge about said shaft.

5. A gauge for measuring the deviation of the flank profiles of the thread of a helical rotor from a known desired profile, said gauge including a body portion, the base of said body portion having means for supporting said gauge on a shaft for annular adjustment thereabout including clamping means for securing said gauge in adjusted position, spaced wings extending forwardly from the respective sides of said body portion adapted to straddle a helical thread of a rotor mounted on said shaft in axial spaced relation with respect to said gauge, micrometers supported by said wings adapted to engage the flanks of said rotor thread, and means for centering said gauge in adjusted position with respect to the rotor thread including a support member extending forwardly from the top of said body portion and an inverted V-block carried by said support and being movable with respect thereto for engaging said helical rotor thread at its crest to orient said gauge in adjusted position.

6. A gauge for measuring the deviation of the flank profiles of the thread of a helical rotor from a known desired profile, said gauge including a body portion, the base of said body portion having means for supporting said gauge on a shaft for rotary adjustment thereabout, spaced wings extending from respective sides of said body portion adapted to straddle a helical thread of a rotor mounted on said shaft in axial spaced relation with respect to said gauge, micrometers supported by said wings in position for adjusting the sensing terminals thereof to engage the flanks of said rotor thread, means for centering the gauge with respect to the rotor thread including a centering block, a support member therefor carried by the top of said body portion for movably supporting said centering block over the crest of said rotor thread, said centering block having a shallow dihedral on one side thereof, the respective sides of which are adapted to tangentially engage the upper ends of the rotor thread flanks whereby to adjust said gauge about said shaft in fixed relation with respect to a median line of said rotor thread which bisects the crest of said thread and extends through the axis of said shaft.

References Cited in the file of this patent

UNITED STATES PATENTS

| 764,203 | Perkins | July 5, 1904 |
| 2,707,321 | Breisch | May 3, 1955 |

FOREIGN PATENTS

| 875,344 | France | Sept. 16, 1942 |